(12) United States Patent
Sapper

(10) Patent No.: US 6,284,037 B1
(45) Date of Patent: Sep. 4, 2001

(54) METHOD OF STABILIZING AN AQUEOUS COATING COMPOSITION

(75) Inventor: Ekkehard Sapper, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/380,421

(22) PCT Filed: Dec. 3, 1998

(86) PCT No.: PCT/DE98/00728

§ 371 Date: Aug. 31, 1999

§ 102(e) Date: Aug. 31, 1999

(87) PCT Pub. No.: WO98/44055

PCT Pub. Date: Oct. 8, 1998

(30) Foreign Application Priority Data

Mar. 27, 1997 (DE) ................................ 197 12 957

(51) Int. Cl.⁷ ................. C09D 7/12; C09D 5/02
(52) U.S. Cl. ................. 106/499; 524/501; 524/522; 524/523
(58) Field of Search ..................... 524/501, 522, 524/523; 106/499

(56) References Cited

U.S. PATENT DOCUMENTS 4,981,904   1/1991   Fischer .

FOREIGN PATENT DOCUMENTS 0 332 014 A1   2/1989   (EP) .
332014  *  9/1999   (EP) ........................... 524/427
2 218 426   5/1989   (GB) .

* cited by examiner

Primary Examiner—David W. Wu
Assistant Examiner—K C Egwim

(57) ABSTRACT

The use as an additive for coating formulations is claimed of a polymer dispersion which comprises (i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid, and (ii) a nonassociative rheology stabilizer comprising an acrylate copolymer based on $C_1$–$C_6$-alkyl (meth)acrylate and (meth)acrylic acid.

17 Claims, No Drawings

METHOD OF STABILIZING AN AQUEOUS COATING COMPOSITION

FIELD OF THE INVENTION

The present invention relates to the use of an acrylate dispersion as an additive for aqueous coating formulations, said additive being particularly suitable for aqueous coating formulations and improving the stability of these coating materials in industrial plants.

BACKGROUND OF THE INVENTION

In the industrial coating of substrates, especially metal substrates, such as autobodies, vessels, etc., the coating systems are typically passed into the coating apparatus from stock tanks through systems of lines. If, for example, 2-component systems comprising coating material and curing agent are employed, these are led from separate stock tanks by way of so-called ring lines from which the components can be taken off at any desired point. In order to obtain uniform coating results it is necessary for the coating components to be applied to the substrate in defined amounts. Precise metering of the coating material, which is constant over the entire course of the procedure, can generally only be obtained if the consistency of the coating material as well, i.e. its viscosity and the homogeneous distribution of the individual coating components in the formulation, remains constant and any fluctuations in viscosity are minor.

In the course of transportation through the ring lines, the coating materials are exposed to high shear stress, which can in some cases result in changes in their viscosity, these changes then leading to a deterioration in the coating outcome.

SUMMARY OF THE INVENTION

The object on which the present invention is based was therefore to provide an additive for coating systems, especially aqueous coating systems, which improves the stability of coating materials which are led through industrial plants, especially by way of lines (ring lines).

The present invention provides for the use of a polymer dispersion as an additive for coating formulations, wherein the polymer dispersion comprises (i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid, and (ii) a nonassociative rheology stabilizer comprising an acrylate copolymer based on $C_1$–$C_6$-alkyl (meth) acrylate and (meth)acrylic acid.

The polymer dispersions used in accordance with the invention are outstandingly suitable as viscosity adjusters and as a stabilizer for coating formulations, especially for aqueous coating formulations, in order to improve the rheological stability of these coating materials. By adding the polymer dispersion employed in accordance with the invention it is possible to modify the viscosity behavior (Theological characteristics) of the coating systems in such a way that even prolonged stress to the coating materials as a result of shearing in the ring line produces no significant changes in viscosity which would lead to poor coating results.

It is also possible to add the polymer dispersion to coating formulations whose viscosity has already fallen to such a point that they can no longer be used in industrial plants. In such cases, the viscosity can be adjusted permanently to almost any desired level by adding the polymer dispersions.

The polymer dispersion used in accordance with the invention has been found particularly suitable as an addition to coating materials, such as metallic paints, for automotive finishing.

the polymer dispersion can be used as an additive for coating formulations in an amount, based on the solids content of the dispersion, of from 0.5 to 10% by weight, in particular from 0.5 to 5% by weight, based on the solids content of the coating formulation.

The acrylate polymer of component (i) that is employed in accordance with the invention can comprise as its $C_1$–$C_8$-alkyl (meth)acrylate monomer units the linear and branched-chain derivatives, preference being given to methyl (meth) acrylate, ethyl (meth)acrylate, n-propyl and isopropyl (meth)acrylates, n-butyl and isobutyl (meth)acrylates, and 2-ethylhexyl (meth)acrylate. As further monomers, (meth) acrylamide monomers and derivatives thereof may also be present.

Examples of vinylaromatic monomers present as monomer units in the acrylate polymer of component (i) include styrene, α-alkylstyrene and vinyltoluene.

The acrylate polymer can be prepared by techniques known from the prior art, an example being emulsion polymerization. The acrylate polymer is preferably employed in the form of a dispersion. During the preparation process, the ratio between the monomers and the water is preferably established such that the resultant dispersion has a solids content of from 30 to 60% by weight, preferably from 35 to 60% by weight, and can be used directly to prepare the basecoat composition. A particularly suitable acrylate polymer is obtainable commercially as an aqueous dispersion under the designation Acronal 290 D (BASF AG; Ludwigshafen).

To prepare a dispersion of the acrylate polymer, the emulsifier employed is preferably an anionic emulsifier, alone or in a mixture with others.

Examples of anionic emulsifiers are the alkali metal salts of sulfuric monoesters with alkylphenols or alcohols, and also the sulfuric monoesters of ethoxylated alkylphenols or ethoxylated alcohols, preferably the alkali metal salts of the sulfuric monoester of a nonylphenol which is reacted with from 4 to 5 mol of ethylene oxide per mol, alkyl- or arylsulfonates, sodium lauryl sulfate, sodium lauryl ethoxylate sulfate, and secondary sodium alkane sulfonates whose carbon chains contains 8–20 carbon atoms. The amount of the anionic emulsifier is from 0.1 to 5.0% by weight, based on the monomers, preferably from 0.5 to 3.0% by weight. Furthermore, in order to increase the stability of the aqueous dispersions it is possible to employ, additionally, a nonionic emulsifier of the type of an ethoxylated alkylphenol or fatty alcohol, e.g., an adduct of 1 mol of nonylphenol with from 4 to 30 mol of ethylene oxide, in a mixture with the anionic emulsifier.

The glass transition temperature of the acrylate polymer is preferably between 15° C. and 35° C., with particular preference between 20° C. and 25° C.

The acrylate polymer employed in accordance with the invention preferably as a number-average molecular mass (determined by gel permeation chromatography using polystyrene as standard) of from 200,000 to 2,000,000, preferably from 300,000 to 1,500,000.

As component (ii) in the basecoat composition, use is made, in accordance with the invention, of acrylate copolymers having groups that are nonassociative, said copolymers comprising $C_1$–$C_6$-alkyl (meth)acrylate and methacrylic acid as monomer units. A preferred copolymer comprises as its monomer units (meth)acrylic acid and at least two different $C_1$–$C_6$-alkyl (meth)acrylate monomers. Within the copolymer the (meth)acrylic acid is present preferably in amounts of from 40% by weight to 60% by weight, with particular preference from 46% by weight to 55% by weight, based on the amount of the overall copolymer. The first Cl-C6-alkyl (meth)acrylate monomer is present preferably in amounts of from 30% by weight to 50% by weight, in particular from 36% by weight to 46% by weight, and the second (meth)acrylate polymer preferably in amounts from 1% by weight to 10% by weight, in particular from 2% by weight to 8% by weight, based in each case on the amount of the overall copolymer. The rheological auxiliary is intended to give the basecoat composition the desired viscosity, especially at the pH employed, which is generally alkaline. A particularly preferred rheology stabilizer is, if present in the form of a dispersion, highly mobile in consistency but thickens at a neutral or basic pH. The acrylate copolymer is suitably employed as a finished dispersion. As emulsifiers, such dispersions preferably contain fatty alcohol alkoxylates, especially $C_8$–$C_{22}$-fatty alcohol ethoxylates. A particularly suitable acrylate copolymer dispersion is available commercially under the designation Viscalex HV 30 (Allied Corporation, Great Britain).

The rheology stabilizer is present in the basecoat composition, used in accordance with the invention, preferably in an amount of from 0.5 to 5.0% by weight, in particular from about 0.3 to 1.5% by weight, based on the solids content. The rheology stabilizer is typically employed as a dispersion having a concentration of from 5 to 45% by weight, preferably from 7 to 35% by weight.

The polymer dispersions can be added to any desired known aqueous coating formulations, such as aqueous formulations based on polyurethane, on polyester, on acrylate or on epoxy, and to aqueous 2-component coating systems based on isocyanate.

The polymer dispersions can be added to the coating composition during the preparation process of said composition or to the finished composition. The individual components (i) and (ii) can be incorporated either as a ready-made mixture or in succession into the formulations. Where the components are added in succession, the acrylate polymer of component (i) is preferably added first. If the rheology stabilizer component (ii) employed is one which exerts its thickening effect at alkaline pH values, then this component is preferably added only to the ready-made mixture. Coating formulations typically have an alkaline pH, and the addition of the rheology stabilizer as component (ii) directly brings about thickening, and hence stabilization, at such a pH, if component (i) is already present as well. Should the pH fall below 7.5, then by renewed neutralization of amines—for example, those referred to below—it should be brought back to a pH typical for coating materials.

If the coating formulation comprises an associative thickener, then it has been found advantageous to add the polymer dispersion prior to the addition of this associative thickener.

It is also possible to use the polymer dispersion to raise the viscosity of a coating composition which has already dropped sharply and to permanently maintain the composition at the newly established viscosity.

On addition to the coating formulation, the polymer dispersion preferably has a pH below 7, in particular from 1 to 5. The pH of the composition is preferably neutralized following the addition of the polymer dispersion. Neutralization can be carried out using ammonia and/or amines (especially alkylamines), amino alcohols and cyclic amines, such as diethylamine and triethylamine, dimethylethanolamine, dimethylaminoethanolamine, diisopropanolamine, morpholine or N-alkylmorpholine, preference being given to highly volatile amines.

The polymer dispersion can be added to the coating formula in amounts typical for additives. Particularly good results are obtained if component (i) -s added to the polymer dispersion, based in each case on the solids content of the coating formulation, in an amount of from 0.25 to 5% by weight, and component (ii) in an amount of from 0.003 to 1% by weight.

The polymer dispersion used in accordance with the invention is outstandingly suitable as an additive for all customary aqueous coating materials, especially for 1-component waterborne coating materials, 2-component waterborne coating materials, and physically drying waterborne coating materials. With particular preference, it is added as an additive to coating materials for the OEM finishing of automobiles.

The present invention additionally provides for the use of the polymer dispersion as an additive for aqueous coating materials in order to increase the rheological stability.

EXAMPLES

Two aqueous metallic paints containing the components listed in Table 1 were prepared, and a determination was made of the initial viscosity and viscosity after 80 days' storage of the coating materials.

|  | Paint 1 | Paint 2 |
| --- | --- | --- |
| Polyurethane dispersion | 9.5[1] | 9[1] |
| OH-containing resin polyester | 5[2] | 1.4[3] |
| Melamine resin | 4.5[4] | 4[5] |
| 2-Ethylhexanol | 2.5 | — |
| Isobutanol | 0.7 | 3 |
| n-Butanol | — | 1 |
| 2-Butoxyethanol | 12 | 4.8 |
| Isopropoxypropanol | — | 3 |
| Butoxypropanol | — | 2 |
| Butyl diglycol | — | 0.2 |
| Synthetic silicate thickener | 1[5] | 1.2[5] |
| Dimethylethanolamine | 0.6 | 0.4 |
| Water | 63 | 65 |
| Carbon black pigment | 1 | — |
| Aluminum pigment | 0.2 | — |
| Blue pigment | — | 1 |
| Mica pigment | — | 3 |
| Polypropylene glycol | — | 1 |
| Initial viscosity (1000 1/s) | 86 mPa · s | 81 mPa · s |
| Viscosity after 80 days | 40 mPa · s | 45 mPa · s |

[1]ZK42-6666, commercial product of BASF Coatings AG, Münster
[2]ZK26-6826, commercial product of BASF Coatings AG, Münster (OH-containing polyester)
[3]ZQ8-56418, commercial product of BASF Coatings AG, Münster (OH-containing acrylate)
[4]Maprenal ® MF650, commercial product of Hoechst AG, Frankfurt
[5]Maprenal ® VFM 3924, commercial product of Hoechst AG, Frankfurt
[6]Laponite ® RD, commercial product of Deutsche Solvay-Werke GmbH 2.2% by weight of Acronal 290 D (component (i)) and 0.095% by weight of Viscalex HV 30 (component (ii)) were added to the stored paint 1. The viscosity rose to 86 mPa·s at 1000 1/s.

2.5% by weight of Acronal 290 D and 0.098% by weight of Viscalex HV 30 were added to the stored paint 2 The viscosity rose to 82 mPa·s at 1000 1/s.

The processing properties of the stored paints 1 and 2 showed no differences from the freshly prepared paints.

What is claimed is:

1. A method of stabilizing an aqueous coating formulation, comprising a step of adding a polymer dispersion to the aqueous coating formulation, wherein said polymer dispersion comprises
   (i) an acrylate polymer prepared by polymerizing from about 30 to about 60% by weight of at least one $C_1$ to $C_8$ alkyl (meth)acrylate monomer, from about 30 to about 60% by weight of at least one vinylaromatic monomer, and from about 0.5 to about 10% by weight of (meth)acrylic acid, and
   (ii) a nonassociative rheology stabilizer comprising an acrylate copolymer prepared by polymerizing at least one $C_1$ to $C_8$ alkyl (meth)acrylate monomer and (meth)acrylic acid.

2. A method according to claim 1, wherein the aqueous coating formulation is selected from the group consisting of one-component waterborne coating formulations, two-component waterborne coating formulations, and physically drying waterborne coating formulations.

3. A method according to claim 1, wherein the polymer dispersion is included in an amount of from about 0.5 to about 10% by weight of the solids content of the dispersion, based on the solids content of the coating formulation.

4. A method according to claim 1, wherein the polymer dispersion is included in an amount of from about 0.5 to about 5% by weight of the solids content of the dispersion, based on the solids content of the coating formulation.

5. A method according to claim 1, wherein the polymer dispersion has a pH of from about 1 to about 6 before being included in the coating formulation.

6. A method according to claim 1, wherein the polymer dispersion is included in the aqueous coating formulation by
   (a) providing an aqueous coating formulation at acidic pH;
   (b) adding the polymer dispersion to the aqueous coating formulation; and
   (c) neutralizing the aqueous coating formulation.

7. A method according to claim 1, wherein the polymer dispersion is included in the aqueous coating formulation by
   (a) providing an aqueous coating formulation having a viscosity that is lower than a desired viscosity and
   (b) adding the polymer dispersion to the aqueous coating formulation to increase the viscosity of the aqueous coating formulation to the desired viscosity.

8. A method according to claim 7, wherein the desired viscosity is about the initial viscosity of the coating formulation prior to storage.

9. A method according to claim 1, wherein the $C_1$ to $C_8$ alkyl (meth)acrylate monomer of component (i) comprises a member selected from the group consisting of methyl (meth)acrylate, ethyl (meth)acrylate, butyl (meth)acrylate, 2-ethylhexyl (meth)acrylate, and combinations thereof.

10. A method according to claim 1, wherein the vinylaromatic monomer of component (i) comprises a member selected from the group consisting of styrene, (α-alkylstyrenes, vinyltoluene, and combinations thereof.

11. A method according to claim 1, wherein component (ii) comprises an ionic acrylate dispersion that forms a fiberlike gel at the pH of the coating formulation.

12. A method according to claim 6, wherein component (ii) comprises an ionic acrylate dispersion that forms a fiberlike gel during step (c).

13. A method according to claim 1, wherein the acrylate polymer of component (i) has a glass transition temperature of from about 15° C. to about 35° C.

14. A method according to claim 1, wherein the acrylate polymer of component (i) has a number average molecular mass of from about 200,000 to about 2,000,000.

15. A method according to claim 1, wherein the acrylate copolymer of component (ii) is prepared using from about 30% to about 50% by weight of a first $C_1$ to $C_8$ alkyl (meth)acrylate monomer, from about 1 % to about 10% by weight of a second $C_1$ to $C_8$ alkyl (meth)acrylate monomer, and from about 40% to about 60% by weight of the (meth)acrylic acid.

16. A method according to claim 1, wherein component (i) is included in an amount of from about 0.25 to about 5% by weight and component (ii) is included in an amount of from about 0.003 to about 1% by weight, based on the solids content of the coating formulation.

17. A method of maintaining a viscosity for an aqueous coating formulation, comprising steps of:
   (a) providing an aqueous coating formulation having an initial viscosity;
   (b) subjecting said coating formulation to conditions that cause the viscosity of the coating formulation to decrease; and
   (c) adding to the coating formulation a polymer dispersion to increase the viscosity of the coating formulation, wherein said polymer dispersion comprises
      (i) an acrylate polymer prepared by polymerizing from about 30 to about 60% by weight of at least one $C_1$ to $C_8$ alkyl (meth)acrylate monomer, from about 30 to about 60% by weight of at least one vinylaromatic monomer, and from about 0.5 to about 10% by weight of (meth)acrylic acid, and
      (ii) a nonassociative rheology stabilizer comprising an acrylate copolymer prepared by polymerizing at least one $C_1$ to $C_8$ alkyl (meth)acrylate monomer and (meth)acrylic acid.

* * * * *